(12) United States Patent
Purvis (10) Patent No.: US 10,513,353 B2
(45) Date of Patent: Dec. 24, 2019

(54) SEGMENTED CURRENT MAGNETIC FIELD PROPULSION SYSTEM

(71) Applicant: James Wayne Purvis, Albuquerque, NM (US)

(72) Inventor: James Wayne Purvis, Albuquerque, NM (US)

(*) Notice: Subject to any disclaimer, the term of this patent is extended or adjusted under 35 U.S.C. 154(b) by 0 days.

(21) Appl. No.: 16/243,327

(22) Filed: Jan. 9, 2019

(65) Prior Publication Data

US 2019/0168897 A1 Jun. 6, 2019

(51) Int. Cl.
*B64G 1/40* (2006.01)
*F03H 99/00* (2009.01)
*H01F 7/20* (2006.01)

(52) U.S. Cl.
CPC ............ *B64G 1/409* (2013.01); *F03H 99/00* (2013.01); *H01F 7/20* (2013.01); *H01F 7/202* (2013.01)

(58) Field of Classification Search
CPC .......... F03H 1/0037; F03H 3/00; F03H 99/00; H01F 7/066; B64G 1/409
See application file for complete search history.

(56) References Cited

U.S. PATENT DOCUMENTS

| | | |
|---|---|---|
| 2,949,550 A | 8/1960 | Brown |
| 2,958,790 A | 11/1960 | Bahnson |
| 3,018,394 A | 1/1962 | Brown |
| 3,187,206 A | 6/1965 | Brown |
| 3,223,038 A | 12/1965 | Bahnson |
| 3,227,901 A | 1/1966 | Bahnson |
| 3,626,605 A | 12/1971 | Wallace |
| 5,280,864 A | 1/1994 | Woodward |
| 6,098,924 A | 8/2000 | Woodward |
| 6,317,310 B1 | 11/2001 | Campbell |
| 6,347,766 B1 | 2/2002 | Woodward |
| 6,411,493 B2 | 6/2002 | Campbell |

(Continued)

FOREIGN PATENT DOCUMENTS

| | | |
|---|---|---|
| GB | 2229865 | 10/1990 |
| GB | 2334761 | 9/1999 |

(Continued)

OTHER PUBLICATIONS

Stafford, Thomas P., "America at the Threshold: Report of the Synthesis Group on America's Space Exploration Initiative", 1991, pp. 64-68, NASA.

(Continued)

*Primary Examiner* — Gerald L Sung
*Assistant Examiner* — William L Breazeal (57) ABSTRACT

The present invention discloses systems and methods for electromagnetic field spacecraft propulsion. The system includes reaction thrust assemblies comprising conductor coils with alternating segments of magnetic field shield assemblies. Unshielded reaction thrust assembly segments are bracketed by field activation coils generating shaped magnetic fields. The action of the magnetic fields on currents in the unshielded coil segments of the reaction thrust assemblies produce unidirectional Lorentz Forces, thereby generating thrust without reaction mass, while reaction momentum is carried away by Poynting Vector fields in conformity with the currently understood principles of electrodynamics.

14 Claims, 8 Drawing Sheets

(56) References Cited

U.S. PATENT DOCUMENTS

| | | |
|---|---|---|
| 6,492,784 B1 | 12/2002 | Serrano |
| 6,775,123 B1 | 8/2004 | Campbell |
| 9,287,840 B1 | 3/2016 | Woodward |
| 10,006,446 B2 * | 6/2018 | Purvis .................... F03H 99/00 |
| 10,135,323 B2 | 11/2018 | Purvis |
| 2014/0013724 A1 | 1/2014 | Fetta |
| 2016/0254737 A1 | 9/2016 | Purvis |

FOREIGN PATENT DOCUMENTS

| | | |
|---|---|---|
| GB | 2399601 | 9/2004 |
| GB | 2537119 | 10/2016 |

OTHER PUBLICATIONS

NASA, "Breakthrough Propulsion Physics Project, Workshop Proceedings", NASA TM/1998-208400, pp. 4-9, 1998, "NASA Breakthrough Propulsion Physics Program".

White, Harold et.al.,AIAA Journal of Propulsion and Power, vol. 33, No. 4, pp. 830-841.

Stebens, C.T., "Forces on Fields", arXiv:1707.04198 [physics.hist-ph], pp. 1-21, 2017.

Feynman, R.P., et.al.,The Feynman Lectures on Physics, vol. II, Ch. 26-2, 1997.

Purvis, J.W., "Unidirectional Lorentz Force on Rectangular Coil-Current Segment System", Private Communication, 2017.

Ladouceur, R.J.R., "Shielded Coil Electrodynamic Propulsion (SCEP), A Feasibility Study", Thesis, AFIT/GSO/ENY/93d-6, pp. 1-1 : 3-23,1993.

* cited by examiner

SEGMENTED CURRENT MAGNETIC FIELD PROPULSION SYSTEM

FIELD OF THE INVENTION

The present invention discloses systems and methods for electromagnetic field spacecraft propulsion. In particular, these systems and methods generate unidirectional Lorentz Forces by the action of magnetic fields from electromagnetic field activation coils on currents in unshielded segments of reaction thrust assemblies, thereby producing thrust without expelling mass.

BACKGROUND OF THE INVENTION

A major issue facing future space exploration is propulsion technologies. The combination of engine mass, propellant mass and associated tankage in traditional propulsion systems imposes practical limits to space missions. The Stafford Synthesis Group (Stafford, *America at the Threshold*) concluded that future space exploration will require advanced propulsion technologies. Subsequently, NASA conducted the *Breakthrough Propulsion Physics Program* (NASA/TM-1998-208400), one intent of which was to identify new propulsion concepts requiring either minimal or no propellant mass. Meeting this goal requires "discovering fundamentally new ways to create motion, presumably by manipulating inertia, gravity, or by any other interactions between matter, fields, and spacetime."

Field propulsion employs electromagnetic field effects for generating propulsion forces, expels no reaction mass, and therefore effectively has an infinite specific impulse. Prior to modern electrodynamics, it had previously been accepted that magnetic field interactions could not be used to produce a propellantless propulsion system due to the required compliance with Newton's Third Law (NTL). However, physicists have known since at least 1952 of apparent violations of NTL, which has led to over thirty US patents and at least two dozen foreign patents being issued for propellantless propulsion devices. Most importantly, recent experimental investigations conducted by NASA with an EM drive device (White, *AIAA Journal of Propulsion and Power*) have definitively confirmed that EM field propulsion is a reality.

One of the important characteristics of an electromagnetic (EM) wave is that it can transport energy from point to point. Stebens (Stebens, *Forces on Fields*) proves mathematically that in electromagnetism, as in Newton's solid body mechanics, the force on matter from an electromagnetic field is balanced by an equal and opposite force from matter on the field. Nobel Laureate Richard Feynman (*The Feynman Lectures on Physics*), among others, noted that the magnetic interaction between two charged particles moving orthogonally to each other apparently does not satisfy NTL in classical Newtonian dynamics; but, if the changing momentum of the electromagnetic fields of the two particles is included, then overall momentum is conserved.

Although isolated moving charges may apparently violate NTL, if they are confined as part of a complete closed circuit the application of Gauss' Law results in net forces on each circuit being equal and opposite in accordance with NTL. However, the Biot-Savart Law from classical physics has recently been used to prove that the magnetic field from a rectangular conducting coil, acting on a specific geometric configuration of an isolated current segment, generates a unidirectional force on the coil-segment system (Purvis, USPTO Private Communication). The present invention is an engineering design developed from this "segmented current" geometry which avoids the "circuit completion" problem so as to create an electromagnetic field spacecraft propulsion system. This electromagnetic field spacecraft propulsion system, which does not require expendable propellant and thus has an effectively infinite specific impulse, is an advanced propulsion technology which will significantly impact both manned and unmanned activities in space.

RELATED ART: PROPELLANTLESS FIELD PROPULSION

Through an electrokinetic phenomenon termed the Biefeld-Brown Effect, electrical energy input into asymmetrical capacitors can be converted to mechanical energy which then provides a force for propelling an object. T. T. Brown, a co-discoverer of the Biefeld-Brown Effect, has been issued U.S. Pat. Nos. 2,949,550, 3,018,394, and 3,187,206 for devices based on utilization of the effect. Brown's colleague A. H. Bahnson has similarly been issued U.S. Pat. Nos. 2,958,790 3,223,038, and 3,227,901 utilizing the effect. NASA is still investigating the use of Brown's discovery, as disclosed in U.S. Pat. Nos. 6,317,310, 6,411,493, and 6,775,123 to Campbell (assigned to NASA). Another such device is disclosed in U.S. Pat. No. 6,492,784 to Serrano, which generates the Biefeld-Brown Effect using stacked-disc asymmetrical capacitors. Debate is ongoing in the literature as to whether the Biefeld-Brown Effect will work in the vacuum of space. Another limitation to using the effect may be the potential for scalability, since asymmetrical capacitor devices to date have consistently reported 50 milli-newtons of thrust from 35 to 45.5 watts of input power.

The most current example of a propellantless field propulsion system is an electromagnetic drive system as disclosed in British Patents GB2229865, GB2334761, GB2399601 and UK Patent Application GB2537119 to Shawyer, as well as U.S. Pat. Appl. No. 20140013724 to Fetta. This system includes an axially-asymmetric resonant cavity with a conductive inner surface adapted to support a standing electromagnetic (EM) wave. The resonating cavity lacks second-axis axial symmetry, thereby causing the standing EM wave to induce a net unidirectional force on the resonant cavity, thus generating thrust without reaction mass. Experimental versions of these EM devices have reported test thrust levels of 8-10 milli-newtons from 10.5 watts of power for the Fetta-Cannae drive. NASA's Eagleworks tested several versions, with 0.091 millinewtons from 17 watts, 0.050 millinewtons from 50 watts, and in a published journal article, 0.048-0.096 millinewtons form 40-80 watts of input power (*AIAA Journal of Propulsion and Power*, op.cit.).

Field modification approaches to propellantless propulsion include apparent reductions in gravitational mass or inertial mass. U.S. Pat. No. 3,626,605 to Wallace discloses a method and apparatus for generating a time-variant non-electromagnetic force field due to the relative motion of moving bodies constituted of elements whose nuclei have half integral "spin" values, with said force field exhibiting itself in the form of an induced secondary gravitational force.

U.S. Application 2016/0254737 to Purvis discloses a method utilizing a mechanically accelerated magnetic field component acting on reaction coils for propellantless electromagnetic propulsion of spacecraft. The method includes both static and rotating electromagnetic coils in special geometric arrangements which are required for the rotating magnetic field accelerations to produce reactionless thrust from the static coils.

U.S. Pat. No. 5,280,864 to Woodward in 1994 discloses a method for producing transient fluctuations in the inertial masses of material objects by employing an effect that is a consequence of relativistic theories of gravitation. This patent is a Continuation In Part (C.I.P.) of application Ser. No. 07/521,992 filed in 1990 as C.I.P. of application Ser. No. 07/031,157 filed in 1987 as C.I.P of application Ser. No. 06/919,647 filed in 1986, now all abandoned. The patent basically uses high frequency vibrating piezoelectric force transducers to accelerate a capacitor array while applying high frequency alternating-current to electrically oscillate ions in the dielectrics. The relativistic Mach Effect was predicted to produce unidirectional forces from this system.

In subsequent U.S. Pat. Nos. 6,098,924, 6,347,766 and 9,287,840, Woodward disclosed various improvements to the device of U.S. Pat. No. 5,280,864 for producing propellantless thrust by using piezoelectric force transducers attached to resonant mechanical structures, in accordance with Mach's principle and local Lorentz-invariance predictions of transient rest mass fluctuations in accelerated objects. The device was designated the "Mach Effect Thruster". The latest U.S. Pat. No. 9,287,840 in 2016 incorporated an improved electronic sensor feedback control system. Subsequently, the device produced 6-7 micronewtons of thrust with a 100 W power input, which is approximately 14 megawatts/newton. The disclosure admits that the device is not scalable and that arrays of multiple small devices will be necessary to generate larger thrusts.

U.S. Pat. No. 10,135,323 to Purvis discloses a segmented-current capacitive-discharge device for spacecraft electromagnetic field propulsion. The system includes capacitor assemblies bracketed by electromagnetic solenoids configured in Helmholtz Coil geometries. Magnetic fields generated by the solenoids acting on segmented currents in conductive discharge elements during capacitor discharge produce unidirectional forces, creating thrust without reaction mass. Another segmented-current concept using capacitors is disclosed in U.S. Pat. No. 10,006,446 to Purvis. The device includes a multi-element capacitor with segmented plates on the cathode, a means for charging and discharging the capacitor, a means for rotating the cathode of the capacitor, one or more electromagnetic coils, and a means for periodically shaping the magnetic fields from the coils. This device uses interactions between magnetic fields from the coils and rotating charged elements on the cathode to achieve thrust without expelling mass, and with power requirements several orders of magnitude less than current proposed systems.

The open literature contains an exemplary study of the use of magnetic shielding for space propulsion: the 1993 thesis of Major R. J. R. Ladouceur at the Air Force Institute of Technology titled "Shielded Coil Electrodynamic Propulsion (SCEP), a Feasibility Study". Ladouceur proposed the use of a partially shielded conducting loop, in effect a segmented current, as a means of satellite propulsion in orbit through the Earth's magnetic field. This pioneering work proposed utilizing the Earth's magnetic field as the driver field, thereby eliminating any concerns about equal-and-opposite reactions in a closed system. However, the use of such a system would be restricted to near-earth operation. Further, the very weak field strength of the Earth requires large currents to generate significant propulsion forces on the system. The study importantly focused on the theory of shielding materials and fields formed in shields enclosing conductors. Experimental testing of the effectiveness of passive magnetic shielding conclusively demonstrated the feasibility of using magnetic shielding to reduce shield strengths on the order of more than 50%. In particular, Ladouceur reported measuring via a torsion pendulum 30 millinewtons of force on a shielded coil with 357 watts of input power.

SUMMARY OF THE INVENTION

An exemplary embodiment of the present invention includes reaction thrust assemblies, magnetic field shields, and field activation coils attached to a structural support plate in a special geometric relation. The reaction thrust assemblies are comprised of current conductors having magnetic field shields on alternating contiguous current conductor segments. Unshielded sections of the reaction thrust assembly are bracketed by the field activation coils. Magnetic fields generated by the field activation coils acting on currents in the unshielded segments of the reaction thrust assemblies produce unidirectional Lorentz Forces, thereby generating thrust without expelling reaction mass, while reaction momentum is carried away by Poynting Vector fields in conformity with the currently understood principles of electrodynamics.

Embodiments of the present invention which generate thrust without the use of reaction mass or expelled propellant do so in a manner distinct from the devices and methods of Brown, Campbell, Serrano, Fetta, Wallace, Shawyer and others as mentioned previously. Engineering analysis and component tests indicate that the present invention is scalable for general space-based applications, and further that such embodiments can generate thrust on the order of tens of newtons from a few hundred watts of input power. This invention differs from current experimental field propulsion systems in that significant thrust levels can be produced without requiring either large electric power sources or complex field generation control systems. This invention is superior to existing high specific impulse fuel-oxidizer engines and electric ion propellant thrusters since significant thrust levels can be produced without expelling propellant, without the need for tanks of propellant, or without requiring large electric power sources.

This invention is capable of a full throttle range simply by either varying the currents through appropriate coils, by mechanically changing the geometry of the magnetic field generators, or a combination of both. Further, three-axis translation and three-axis rotation is achieved without the need for either gimballing systems or dedicated attitude thrusters. Unlike spacecraft with conventional propulsion systems, the best mode of the present invention is capable of decelerating to a full stop or reversing thrust for backward flight without the requirement of rotating the spacecraft 180 degrees. Combining these advantages with the capability of reusability without refueling, as well as long duration continuous thrusting, this invention represents a significant advance in spacecraft propulsion. In addition to space-based applications, embodiments of the present invention may also be used to generate thrust in terrestrial applications.

BRIEF DESCRIPTION OF THE DRAWINGS

The accompanying drawings, which are incorporated in and form part of the specification, illustrate various principles of operation and examples of the present invention, including a preferred embodiment of the invention, as well as alternate embodiments, and, together with the detailed description, serve to explain the principles of the invention.

SCIENTIFIC BASIS FOR THE INVENTION

Figure 1:
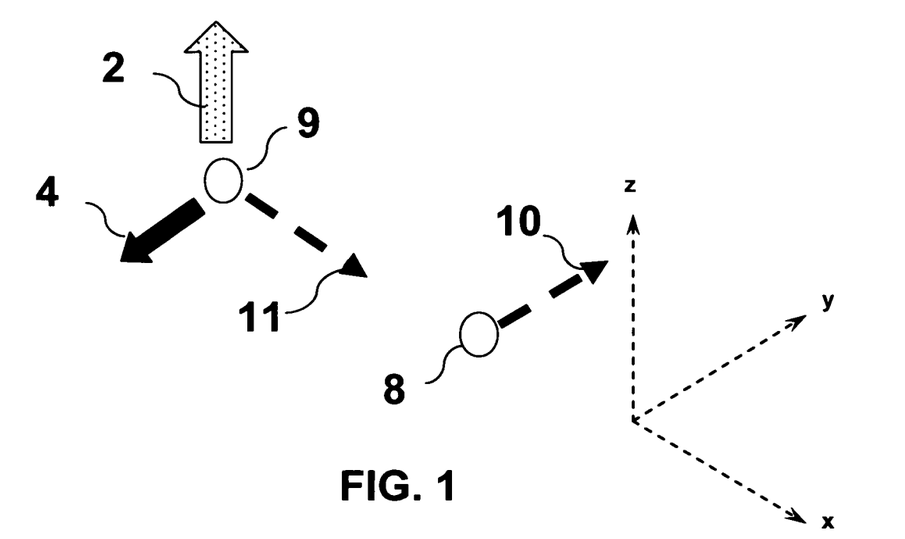
FIG. 1 is a schematic diagram illustrating the unidirectional Lorentz Force acting on charged particles moving orthogonally in the same plane.

By way of further background, the situation presented in FIG. 1 is well known to those skilled in the art and familiar with the works of Feynman and others. The figure illustrates two positively charged coplanar particles 8 and 9 moving with respective orthogonal velocities 10 and 11, with velocity vector 10 being parallel to the y-axis of the coordinate system shown, and velocity vector 11 being parallel to the x-axis. At the instant shown, particle 8 induces a magnetic field 12 on particle 9, while particle 9 induces no magnetic field on particle 8. As a result, a Lorentz Force component 4 acts on particle 9, while no reaction force acts on particle 8. This situation has been well-studied in the literature as an apparent violation of Newton's Third Law. However, to date experimental attempts for devising a propellantless propulsion device based on this phenomenon have confined the charged particles in continuous current loop conductors, and in accordance with Gauss' Law, when all forces are properly accounted for on the continuous current loops, no net unidirectional system force is produced on the system.

Figure 2:
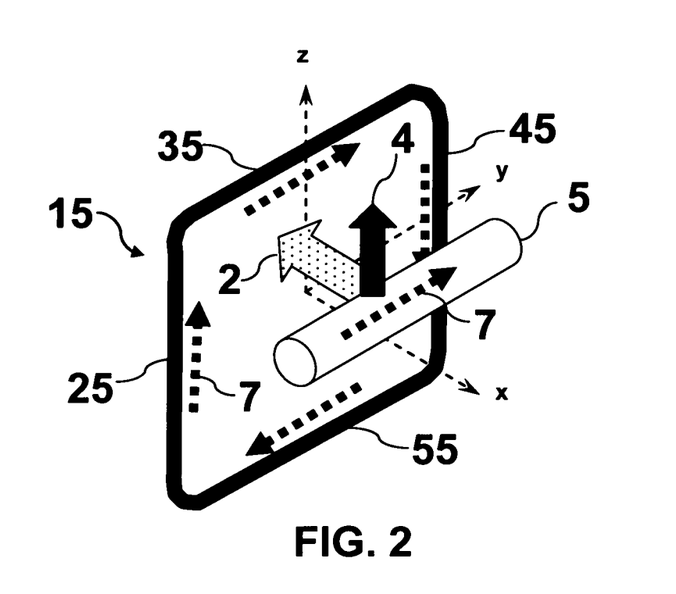
FIG. 2 is a schematic diagram illustrating the unidirectional Lorentz Force on a segmented conductor due to a perpendicular electromagnetic coil.

With reference to FIG. 2, a single turn rectangular electromagnetic coil 15, comprised of four contiguous conductor segments 25, 35, 45, and 55, is positioned in the y-z plane of the coordinate system shown such that the axis of symmetry of the coil is in the direction of the x-axis. When energized with a current 7, the coil 15 produces a net magnetic field 2 with strongest vector component along the x-axis. A conductor segment 5 also carrying a current 7 is positioned parallel to and displaced some x-distance from the y-axis such that it crosses the axis of symmetry of the coil 15 as shown. The horizontal conductor pair 35 and 5 produce equal and opposite Lorentz Forces on each other in accordance with Ampere's Law. Similarly, the horizontal conductor pair 55 and 5 produce equal and opposite Lorentz Forces on each other also in accordance with Ampere's Law. The vertical conductor segments 25 and 45 both produce magnetic field distributions in the x-axis direction along the horizontal conductor segment 5, resulting in the net Lorentz Force 4 on the conductor segment 5. However, the conductor segment 5 does not produce any net magnetic field on either of vertical conductors 25 or 45, as is easily verified using the Biot-Savart Law. Therefore a net unidirectional force is produced on this system due to this unique geometric configuration. It is the innovation of the present invention to engineer and exploit this specific conductor segment geometry to produce thrust by electromagnetic field reaction without expelling propellant.

Figure 3A:
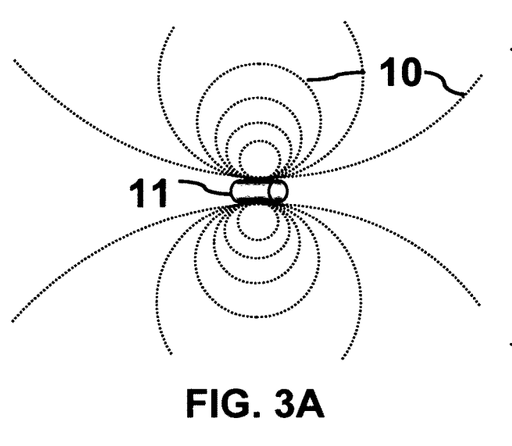
FIGS. 3A-B are schematic diagrams illustrating the magnetic field lines about an isolated magnet and about a magnet in the vicinity of an iron plate shield.
Figure 3B:
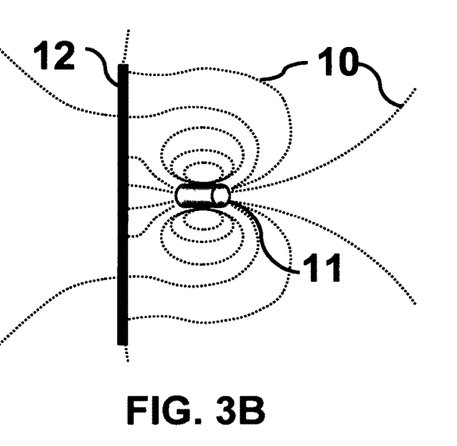

By way of further background, the situation presented in FIGS. 3A-B is well known to those skilled in the art and familiar with the effect of an iron plate on the magnetic field. FIG. 3A illustrates the magnetic field, depicted by lines 10, generated by an isolated cylindrical magnet 11. FIG. 3B illustrates the distortion of the magnetic field lines 10 about the same isolated cylindrical magnet 11 when an iron plate 12 is placed in proximity of one pole of the magnet. There is an area on the side of the plate opposite to the magnet which is shielded and effectively contains a reduced magnetic field. Modern technology has produced magnetic field shielding materials much lighter and more efficient than the iron plate.

Figure 4A:
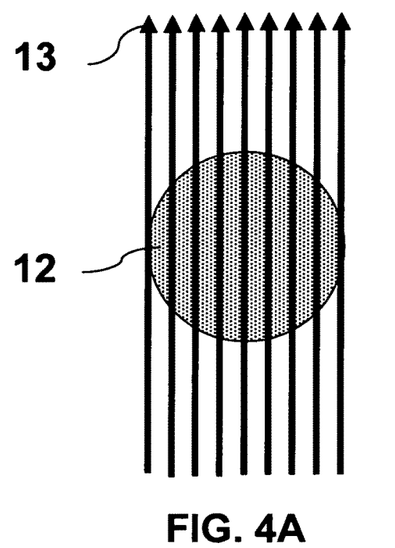
FIGS. 4A-B are schematic diagrams illustrating the magnetic field lines about a Meissner Effect semiconductor above and below its critical temperature.
Figure 4B:
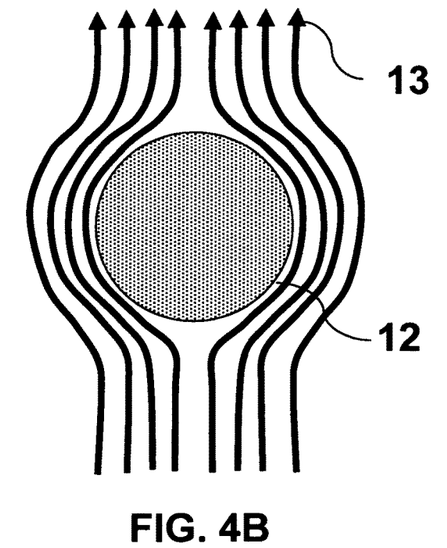

By way of further background, the situation presented in FIGS. 4A-B is also well known to those skilled in the art and familiar with the ability of a Meissner Effect superconductor to displace a magnetic field. FIG. 4A illustrates field lines 13 from an external magnetic means passing through a superconductor 12 when the superconductor is above its critical temperature. FIG. 4B illustrates the expulsion of the magnetic field lines 13 produced when the superconductor is below its critical temperature. In this situation the superconductor rejects the magnetic field, and no field effects exist inside the superconductor.

Figure 5:
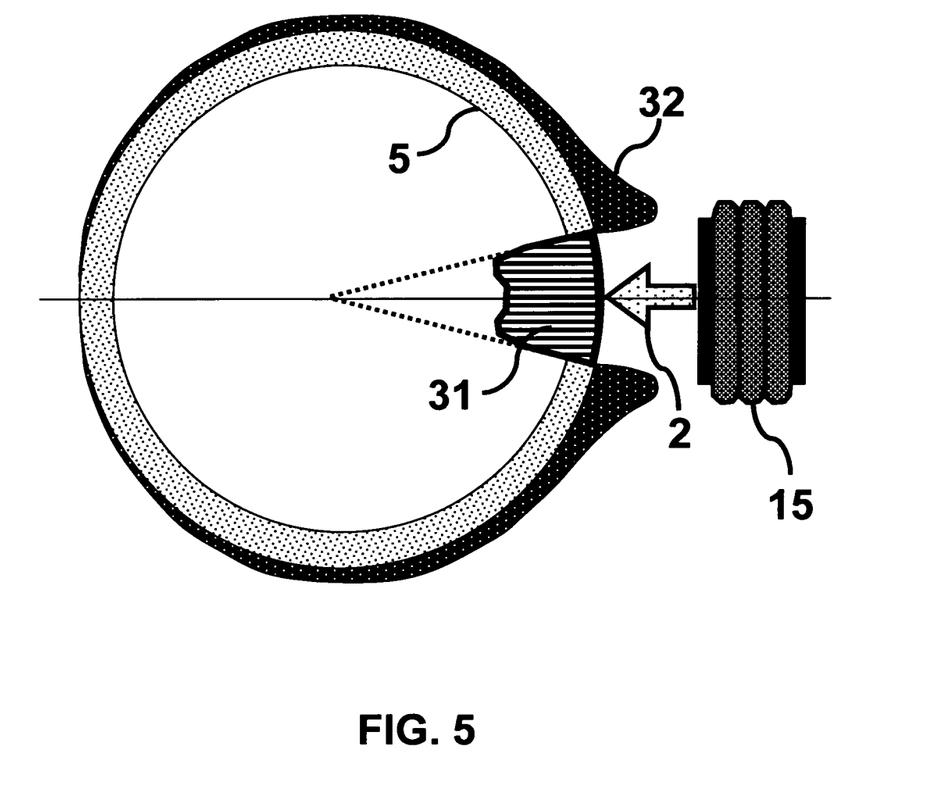
FIG. 5 is a schematic diagram illustrating the radial magnetic field induced on a planar circular conductor by a coplanar electromagnetic coil.

With reference to FIG. 5, an electromagnetic coil 15 is positioned such that the axis of symmetry of the coil is in the plane of a single turn circular conductor 5. When energized, the coil 15 produces a magnetic field 2 at its axis of symmetry, and further produces the magnetic field distribution 31 and 32 induced on conductor 5. The portion 31 of this field distribution points radially inward, while the portion 32 points radially outward. This magnetic field distribution interacts with the current in conductor 5 to produce a continuous Lorentz Force distribution, normal to the plane of the conductor, with distribution 31 producing a force oppositely directed to that produced by distribution 32. In accordance with Gauss' Law, the integral of this force distribution around the conductor always results in no net force on the conductor.

Figure 6:
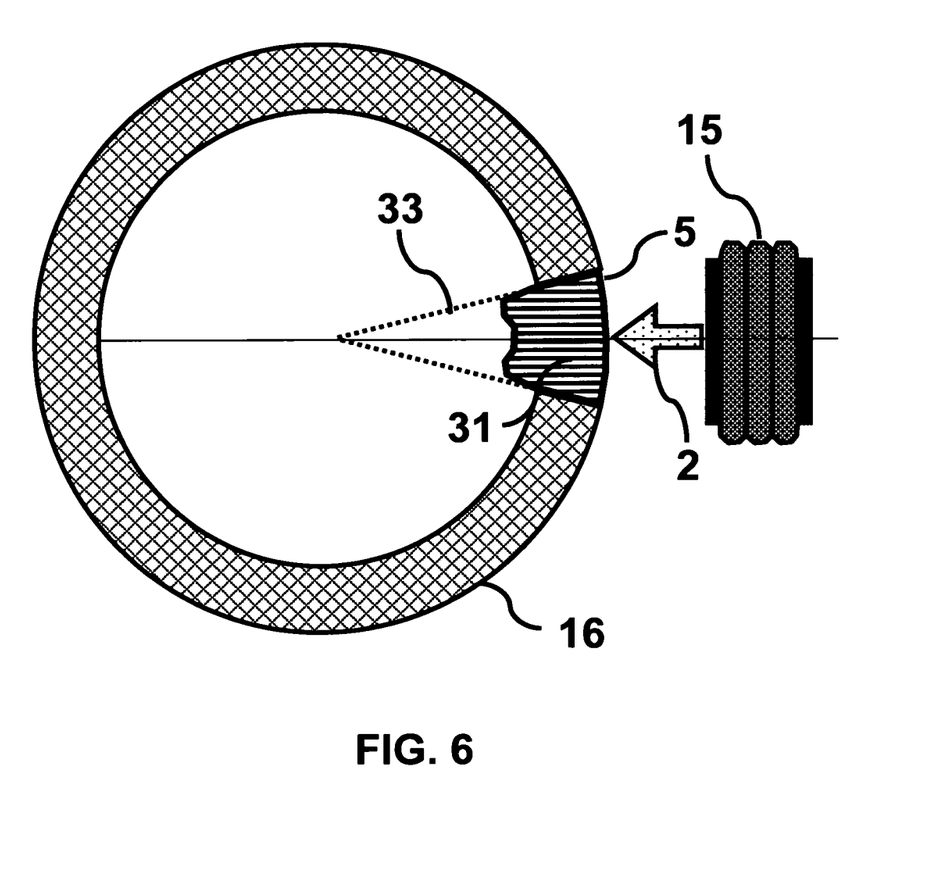
FIG. 6 is a schematic diagram illustrating the effect of shielding on the radial magnetic field induced on a planar circular conductor by a coplanar electromagnetic coil.

With reference to FIG. 6, the coil 15-conductor 5 arrangement of FIG. 5 is modified by the introduction of magnetic shield material 16, such as previously illustrated in FIGS. 4A-B and 5A-B, around all of conductor 5 except for that portion of conductor 5 lying within angle 33. Assuming a perfect shield, the only radial magnetic field components produced by coil 15 which interact with conductor 5 are the components 31. The addition of shield 16 thus reproduces in FIG. 6 the geometry of FIG. 2, and results in a unidirectional Lorentz Force perpendicular to the plane of the coil 15-conductor 5 arrangement.

The result of FIG. 6, based on the known physics illustrated in FIGS. 1-5, comprises the scientific basis for the current invention. It is the purpose of the present invention to exploit the situation illustrated in FIG. 6 through appropriate geometric design by devising various embodiments of continuous current conductors having both unshielded and shielded current segments exposed to external magnetic fields from solenoids in such manner that unidirectional Lorentz Forces are produced on the solenoid-conductor system, thereby generating thrust without expelling propellant.

DETAILED DESCRIPTION OF PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 7:
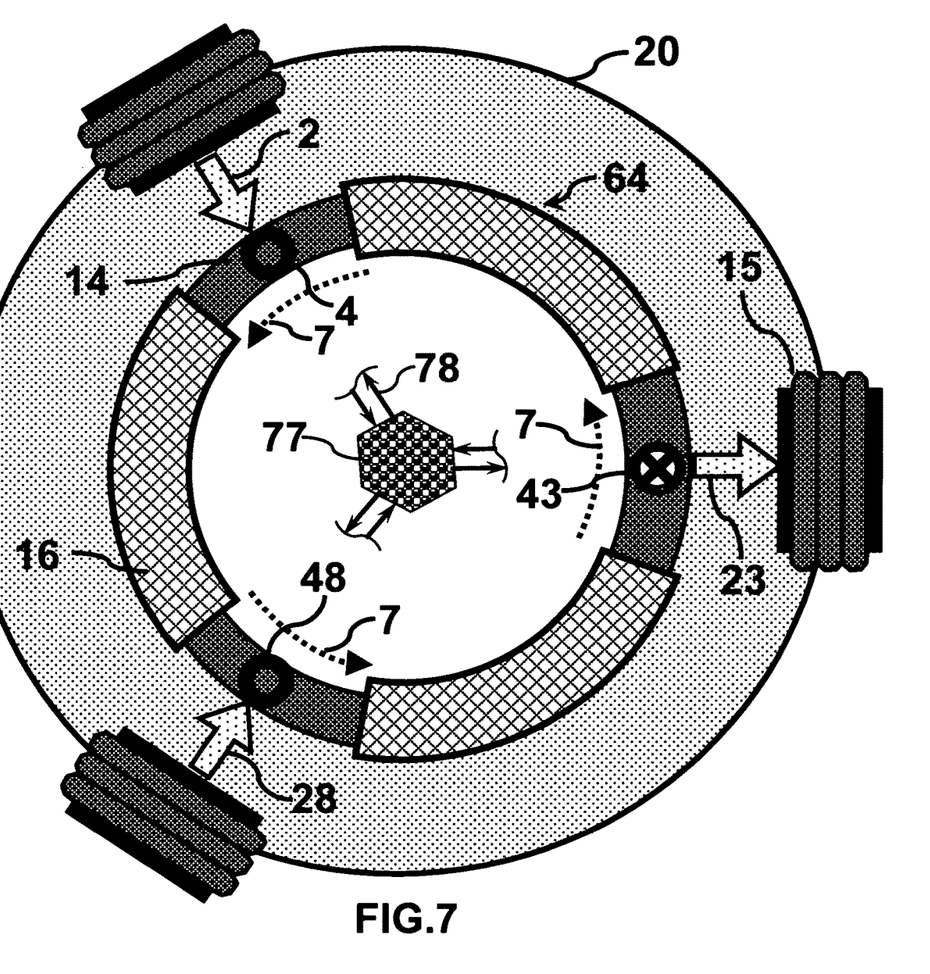
FIG. 7 is a schematic diagram illustrating the basic embodiment of the present invention using a circular thrust assembly to produce an axial thrust.

The basic embodiment of the present invention is illustrated in FIG. 7, which presents a top view of the geometry of the invention as well as the method of generating forces and moments. A circular conducting coil 14, consisting of one or more turns of insulated conductive wire carrying a current 7, is covered on three separate segments with magnetic shielding material 16, whereby coil 14 and magnetic shields 16 form a reaction thrust assembly 64 attached to structural support plate 20. Three electromagnetic field activation coils 15 having high magnetic permeability cores are positioned symmetrically around the circumference of and centered on the unshielded segments of coil 14, attached to and oriented with axes of symmetry aligned radially toward the axis of symmetry of structural support plate 20. An energy supply unit 77 is attached to the center of structural support plate 20, said unit having connective wiring 78 supplying current to both the field activation coils 15 and coil 14 of the reaction thrust assembly. When energized with varied currents, field activation coils 15 produce magnetic fields 2, 23 and 28, with field 23 having reversed polarity for the purpose of illustration, which fields interact with the currents 7 in the unshielded segments of coil 14 on the reaction thrust assembly 64 to produce unidirectional Lorentz Force components 4, 43 and 48, with force 43 being oppositely directed with respect to forces 4 and 43 as shown. The result is a net unidirectional Lorentz Force, comprising the vector the sum of forces 4, 43 and 48, which is Parallel to the axis of symmetry—i.e., perpendicular to the plane—of coil 14, as in the manner previously shown in FIG. 2 and FIG. 6. Further, the moments due to forces 4, 43 and 48 produce a net unidirectional torque on the system parallel to the plane of reaction thrust assembly 64.

Figure 8:
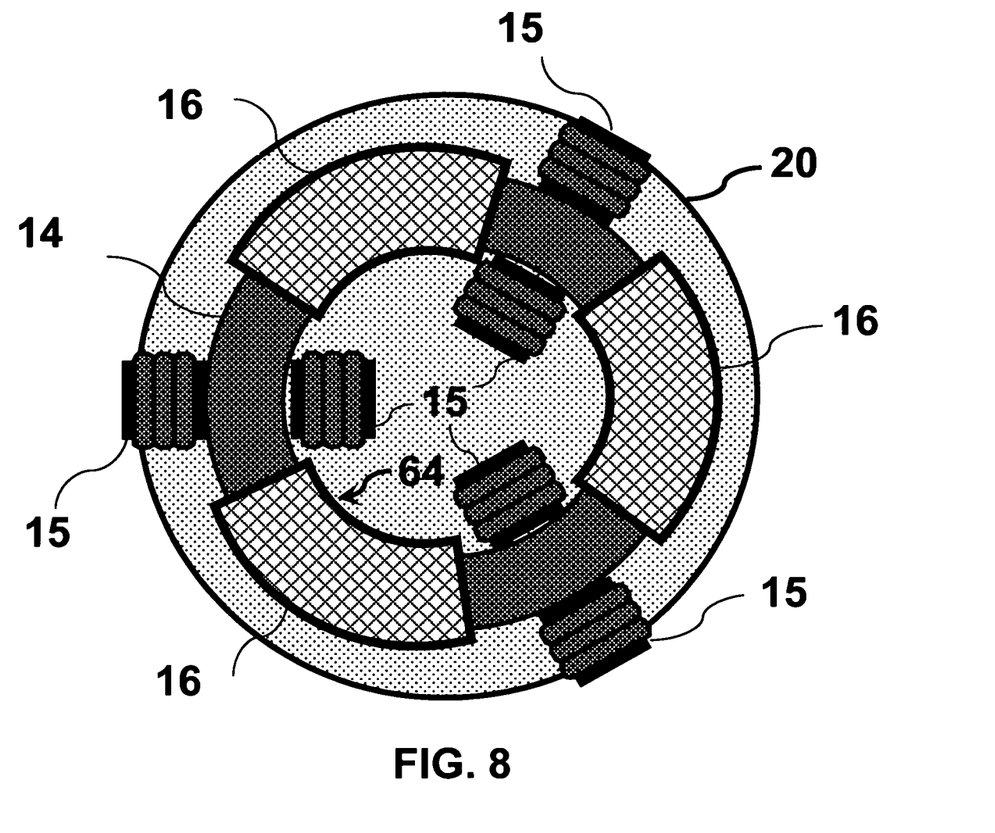
FIG. 8 is a schematic diagram illustrating the use of Helmholtz coils for magnetic field enhancement.

A further enhancement of the present invention is illustrated in FIG. 8, which is a top view similar to the embodiment of FIG. 7. A circular conducting coil 14, consisting of a plurality of turns of insulated conductive wire carrying a current is covered on three separate segments with magnetic shielding material 16, coil 14 and magnetic shields 16 effectively forming a reaction thrust assembly 64 attached to a structural support plate 20. Six field activation coils 15 having high magnetic permeability cores are further attached to the structural support plate 20 and positioned symmetrically in Helmholtz Coil pairs, with one of each pair radially inside and one radially outside of coil 14, around the circumference of and centered on the unshielded segments of reaction thrust assembly coil 14, with axes of symmetry of each pair of field activation coils 15 aligned radially toward the axis of symmetry of structural support plate 20. When energized, field activation coils 15 produce magnetic fields which interact with the current in the unshielded segments of reaction thrust assembly coil 14 to produce a net unidirectional Lorentz Force perpendicular to the plane of aligned radially toward the axis of symmetry of structural support plate 20. Through appropriate variations of the respective currents in coils 15, a unidirectional torque parallel to the plane of reaction thrust assembly coil 14 is produced on the system. The use of Helmholtz Coil pairing both improves the magnetic field strengths and smoothes the field distribution on the unshielded segments of coil 14.

Figure 9:
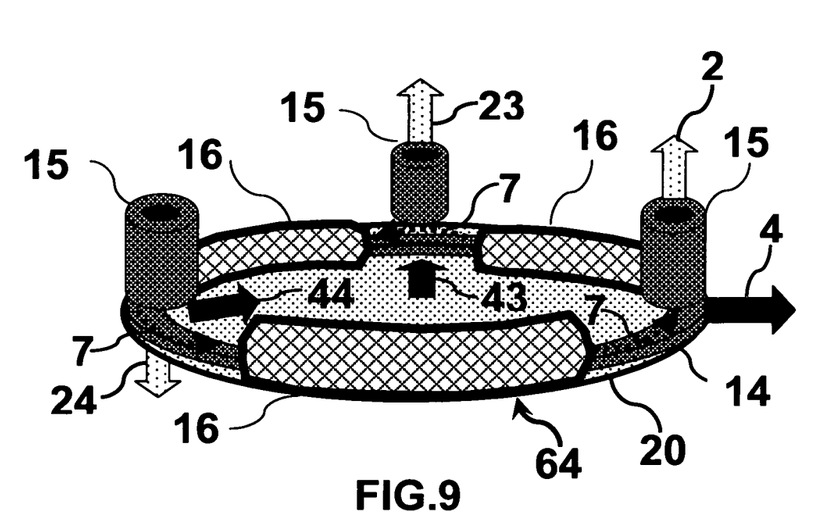
FIG. 9 is a schematic diagram illustrating one embodiment of the present invention using a circular thrust assembly to produce an in-plane lateral thrust.

A perspective view of a further embodiment of the present invention is illustrated in FIG. 9. A circular conducting coil 14, consisting of one or more turns of insulated conductive wire carrying a current, is covered on three separate segments with magnetic shielding material 16, coil 14 and magnetic shields 16 forming a reaction thrust assembly 64. Three electromagnetic field activation coils 15 having high magnetic permeability cores are positioned circumferentially above the center of the unshielded segments of coil 14, with the axis of symmetry of each of field activation coils 15 being perpendicular to the plane of the reaction thrust assembly 64. All components are rigidly attached to structural support plate 20 in the specified geometry. When energized appropriately with variable currents, field activation coils 15 produce magnetic fields 2, 23, and 24, field 24 having reversed polarity with respect to fields 2 and 23, which fields interact with the current 7 in the unshielded segments of coil 14 in the reaction thrust assembly 64. The Lorentz Force interaction produces the three forces 4, 43, and 44 in the plane of structural support plate 20, which forces vectorially sum to a net unidirectional lateral Lorentz Force parallel to the plane of the reaction thrust assembly 64.

Figure 10:
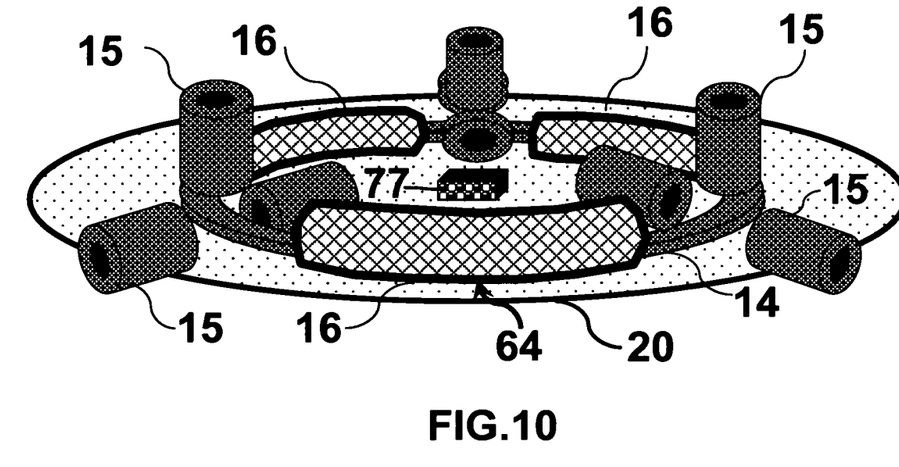
FIG. 10 is a schematic diagram illustrating the best mode of the present invention using a circular thrust assembly to produce both axial and lateral thrusts.

The best mode of the present invention is illustrated in perspective view in FIG. 10, which is a combination of the embodiments from FIG. 8 and FIG. 9. A circular conducting coil 14, consisting of one or more turns of insulated conductive wire carrying a current, is covered on three separate segments with magnetic shielding material 16, coil 14 and magnetic shields 16 forming a reaction thrust assembly 64. Six field activation coils 15 having high magnetic permeability cores are positioned symmetrically in Helmholtz Coil pairs, with one of each pair radially inside and one radially outside of coil 14, around the circumference of and centered on the unshielded segments of reaction thrust assembly coil 14, with axes of symmetry of each pair oriented along radials of from the axis of symmetry of structural support plate 20. Three additional electromagnetic field activation coils 15 having high magnetic permeability cores are positioned circumferentially above the center of the unshielded segments of coil 14, with the axes of symmetry of each of these field activation coils 15 being perpendicular to the plane of the reaction thrust assembly 64. All components are rigidly attached to structural support plate 20 in the geometry shown. When energized with appropriately shaped currents from energy supply unit 77, as previously illustrated in FIG. 7 and FIG. 9, field activation coils 15 produce both vertical and horizontal magnetic fields which interact with the current in the unshielded segments of coil 14 in the reaction thrust assembly to produce net unidirectional axial and lateral Lorentz Forces both parallel to and perpendicular to the structural support plate 20, as well as a unidirectional torque parallel to the plane of the structural support plate 20. This embodiment has fully coupled 3-axis translation and 3-axis rotation without the necessity of either gimbaled nozzles or of dedicated attitude control thrusters, thereby resulting in a significant advance in propulsion technology.

Figure 11:
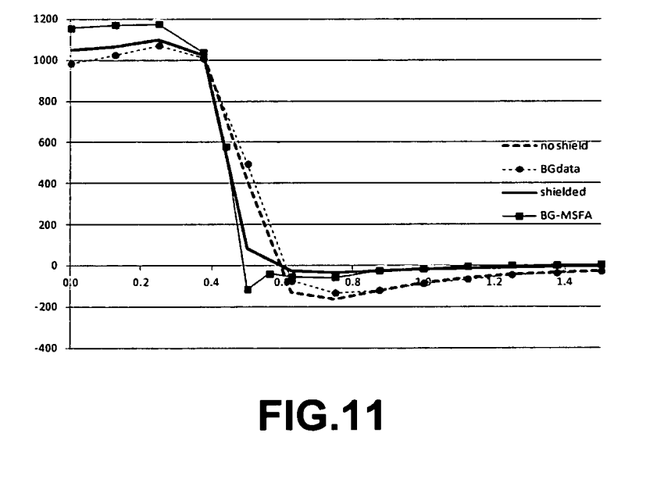
FIG. 11 is a plot of theoretical calculations versus experimental data illustrating the shield effect on axial magnetic field.

An engineering analysis code was developed to design and predict the performance of the embodiment of FIG. 7. FIG. 11 illustrates the accuracy of the engineering design model in predicting the radial variation of axial magnetic field strength for both shielded and unshielded fields perpendicular to the axis of symmetry of a Neodymium-Cobalt disc magnet.

The analytical model was then used to design and calculate the performance of two configurations of the embodiment of FIG. 7, one design operating at a current of 1 Amp and the other design operating at 2 Amps. The diameter of the reaction thrust assembly in both configurations was 12". Both configurations were designed to operate nominally at 100 watts of power input.

For the 1 Amp configuration, the reaction thrust assembly coil 14 was comprised of 1024 turns of 0.0285" diameter #21 AWG copper wire having a linear resistance of 12.8Ω per 1000 feet. The field activation coils were comprised of 1024 turns of 0.0285" diameter #21 AWG copper wire wound on a 1" diameter metal core having magnetic permeability of 2.0, said wound coil having 16 turns axially and 64 turns radially. Six field activation coils were evenly spaced circumferentially at 60 degree intervals. Magnetic shield assemblies comprised three layers of MuMetal magnetic shielding with 50% measured field reduction for each layer, thereby producing a total shield effectiveness of 87.5%. Currents of 1 amp were applied in all conductors. Each field activation coil produced 0.593 newtons of thrust for a combined system thrust of 3.56 newtons at 99.6 watts. The calculated system power consumption was 27.98 watts/newton. These design values are produced in Table 1, which presents a comparison with experimental results for several propellantless propulsion devices.

TABLE 1

| Device | Thrust (mN) | Power (kW) | kW/N |
| --- | --- | --- | --- |
| Biefeld-Brown Effect | 50 | 0.035-0.046 | 0.701-0.910 |
| NASA Emdrive-2014 | 0.091 | 0.017 | 186 |
| NASA Emdrive-2015 | 0.050 | 0.050 | 1000 |
| NASA Emdrive-2017 | 0.048-0.096 | 0.040-0.080 | 833 |
| Fetta-Cannae Drive | 0.008-0.010 | 0.0105 | 1.05-1.31 |
| Woodward (2016) | 0.007 | 0.100 | 14,286 |
| Ladouceur | 30 | 0.357 | 11.9 |
| Present Device (1 Amp)* | 3560 | 0.0996 | 0.028 |
| Present Device (2 Amp)* | 6040 | 0.100 | 0.017 |

*Engineering design-specific calculations

For the 2 Amp configuration, the reaction thrust assembly coil 14 was comprised of 500 turns of 0.0403" diameter #18 AWG copper wire having a linear resistance of 6.385Ω per 1000 feet. The field activation coils were comprised of 500 turns of 0.0403" diameter #18 AWG copper wire wound on a 2" diameter metal core having magnetic permeability of 2.0, said wound coil having 20 turns axially and 25 turns radially. Six field activation coils were evenly spaced circumferentially at 60 degree intervals. Magnetic shield assemblies comprised of three layers of MuMetal magnetic shielding with 50% measured field reduction for each layer, thereby producing a total shield effectiveness of 87.5%. Currents of 2 amps were applied in all conductors. Each field activation coil produced 1.006 newtons of thrust for a combined system thrust of 6.04 newtons at 100 watts. The calculated system power consumption was 16.56 watts/newton. These design values are also produced in Table 1 for comparison with experimental results of several propellantless propulsion devices.

Due to obviousness considerations, certain claim elements are not presented in detail in the Specification. For example, the use of stepper motors to vary field activation coil orientation angles, the use of two concentric reaction thrust assemblies of different diameters to bracket one circumferential array of field activation coils, enclosing parts of the field activation coils in magnetic field shields, and the use of exotic magnetic field shielding materials, are variations of the present invention that will become obvious to spacecraft propulsion system experts designing to specific mission requirements. It is to be understood that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

What is claimed:

1. An electromagnetic field propulsion system comprising:
   a structural support plate having a planform shape of a circle, oval, triangle, or other n-sided polygon and comprised of any combination of lightweight, non-magnetic materials selected from the group consisting of: aluminum, titanium, high-impact plastic, fiberglass, and carbon fiber composites, for the purpose of maintaining specific component geometries;
   a conducting coil comprising one or more turns of insulated conductive wire wound in the manner of an air-core solenoid;
   a plurality of magnetic field shield assemblies for the function of attenuating magnetic fields directed onto designated shielded segments of said conducting coil;
   a reaction thrust assembly comprising the structural support plate, the conducting coil, and the plurality of magnetic field shield assemblies, wherein said plurality of magnetic field shield assemblies enclose segments of the conducting coil, and wherein both said conducting coil and said plurality of magnetic field shield assemblies are attached circumferentially to the structural support plate;
   at least two field activation coils comprising insulated electrical current conductors wound in the manner of electromagnetic solenoids on cores having relative magnetic permeability of at least 2, for the function of generating directed magnetic fields onto unshielded segments of said conducting coil of said reaction thrust assembly,
   an energy supply unit attached to the structural support plate for the purpose of supplying electric current to the at least two field activation coils and to the conducting coil of the reaction thrust assembly, said energy supply unit to be comprised of any combination selected from the group consisting of: storage batteries, fuel cells, solar panels, radioisotopic thermal generators, and nuclear electric generator systems;
   whereby a net unidirectional Lorentz Force acts on the electromagnetic field propulsion system, wherein said net unidirectional Lorentz Force results from electrical currents in the at least two field activation coils generating the directed magnetic fields which interact with electric current in the conducting coil of the reaction thrust assembly, and further wherein reaction momentum is carried away by Poynting Vector fields thereby producing thrust on the electromagnetic field propulsion system without expelling propellant.

2. The electromagnetic field propulsion system according to claim 1, wherein said conducting coil of said reaction thrust assembly and the current conductors wound on said at least two field activation coils are comprised of any combination from the following group: insulated aluminum wire, insulated copper wire, insulated silver wire, insulated gold wire, insulated carbon fiber, insulated multi-walled carbon nanotubes, insulated graphene strips, insulated graphene fibers, insulated graphene yarn, and insulated graphene wire.

3. The electromagnetic field propulsion system according to claim 1, wherein said cores of said at least two field activation coils comprise one or more high relative magnetic permeability materials selected from the group consisting of: ferritic annealed stainless steel, electrical steel, 99.8% pure iron (Fe), 80% Ni-20% Fe alloy, Cobalt-iron high permeability strip material, 70% Ni-16% Fe-2% Chromium alloy, 70% Ni-16% Fe-2% Molybdenum alloy, Co—Fe—Si—B—Nb—Cu soft magnetic alloy, 99.95% pure iron (Fe) annealed in hydrogen, and iron-based alloy with 1.41 Telsa field saturation limit and 20 K-35 K magnetic permeability.

4. The electromagnetic field propulsion system according to claim 1, wherein pairs of said at least two field activation coils are geometrically positioned in Helmholtz Coil configurations radially bracketing magnetically unshielded segments of the conducting coil of the reaction thrust assembly so as to maximize a magnetic field strength on each magnetically unshielded segment.

5. The electromagnetic field propulsion system according to claim 1, wherein the at least two field activation coils are attached to stepper motors so as to vary both geometric position and angular orientation of each of the at least two field activation coils with respect to the structural support plate by rotating each of said field activation coils about an axis parallel to a plane of the structural support plate.

6. The electromagnetic field propulsion system according to claim 1, wherein segments of said at least two field activation coils are enclosed within the plurality of magnetic field shield assemblies.

7. The electromagnetic field propulsion system according to claim 1, wherein the plurality of magnetic field shield assemblies are comprised of one or more layers of common magnetic field shielding materials selected from the group consisting of iron, copper, silver, gold, and electrical steel.

8. The electromagnetic field propulsion system according to claim 1, wherein the plurality of magnetic field shield assemblies are comprised of one or more layers of advanced technology passive materials designed specifically to attenuate incident magnetic fields, selected from the group consisting of: 70% Ni-16% Fe-2% Chromium alloy, 70% Ni-16% Fe-2% Molybdenum alloy, nickel-free tin-plated magnetic shielding sheet alloy, and 80% Ni-20% Fe alloy.

9. The electromagnetic field propulsion system according to claim 1, wherein the plurality of magnetic field shield assemblies are comprised of one or more layers of superconducting materials exhibiting the Meissner Effect.

10. The electromagnetic field propulsion system according to claim 1, wherein the plurality of magnetic field shield assemblies are comprised of one or more layers of metamaterial alloys designed specifically to exhibit relative magnetic permeability sign reversal at certain frequencies of incident magnetic fields.

11. The electromagnetic field propulsion system according to claim 1, whereby modulated currents from the energy supply unit applied to the current conductors on the at least two field activation coils generate time-variable shaped magnetic fields of desired polarity, intensity and duration from each of said coils thereby controlling the magnitude of the net unidirectional Lorentz Force acting on the electromagnetic field propulsion system.

12. The electromagnetic field propulsion system according to claim 1, whereby modulated currents from the energy supply unit applied to the conducting coil on said reaction thrust assembly thereby control the net unidirectional Lorentz Force acting on the electromagnetic field propulsion system.

13. The electromagnetic field propulsion system according to claim 1, whereby currents applied from the energy supply unit to the conducting coil on the reaction thrust assembly, and whereby differential currents from the energy supply unit applied simultaneously to two diametrically opposed field activation coils configured with axes perpendicular to the plane of the reaction thrust assembly and positioned above the plane of the reaction thrust assembly, below the plane of the reaction thrust assembly, or both above and below the plane of the reaction thrust assembly thereby generate a net unidirectional Lorentz Force on the electromagnetic spacecraft propulsion system parallel to the plane of the structural support plate.

14. The electromagnetic field propulsion system according to claim 1, wherein two field activation coils comprise diametrically opposed field activation coils, and whereby currents applied from the energy supply unit to the conducting coil on the reaction thrust assembly, and whereby differential currents applied simultaneously from the energy supply unit to the current conductors in the at least two diametrically opposed field activation coils thereby generate a net unidirectional torque on the electromagnetic spacecraft propulsion system parallel to the plane of the structural support plate.

* * * * *